US012618959B2

(12) United States Patent
Inoue

(10) Patent No.: US 12,618,959 B2
(45) Date of Patent: May 5, 2026

(54) DETECTION SYSTEM, SENSOR SYSTEM, DETECTION METHOD, AND RECORDING MEDIUM

(71) Applicant: Panasonic Intellectual Property Management Co., Ltd., Osaka (JP)

(72) Inventor: Kenichi Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 282 days.

(21) Appl. No.: 18/558,344

(22) PCT Filed: Apr. 26, 2022

(86) PCT No.: PCT/JP2022/018974
§ 371 (c)(1),
(2) Date: Oct. 31, 2023

(87) PCT Pub. No.: WO2022/249840
PCT Pub. Date: Dec. 1, 2022

(65) Prior Publication Data
US 2024/0219550 A1      Jul. 4, 2024

(30) Foreign Application Priority Data

May 25, 2021      (JP) ................................. 2021-088002

(51) Int. Cl.
*G01S 13/32* (2006.01)
*G01S 7/35* (2006.01)
(Continued)

(52) U.S. Cl.
CPC .............. *G01S 13/32* (2013.01); *G01S 7/354* (2013.01); *G01S 7/418* (2013.01); *G01S 13/726* (2013.01)

(58) Field of Classification Search
CPC .......... G01S 13/32; G01S 7/354; G01S 7/418; G01S 13/726
See application file for complete search history.

(56) References Cited

U.S. PATENT DOCUMENTS 11,906,616 B2 * 2/2024 Du .......................... G01S 13/343
2006/0279453 A1 * 12/2006 Caber ................... G01S 13/726
342/195

(Continued)

FOREIGN PATENT DOCUMENTS

| CN | 111781608 A | 10/2020 |
| JP | 2013-096828 A | 5/2013 |
| KR | 10-2021-0032283 A | 3/2021 |

OTHER PUBLICATIONS

International Search Report dated Jun. 14, 2022 issued in International Patent Application No. PCT/JP2022/018974, with English translation.

(Continued)

*Primary Examiner* — Marcus E Windrich
(74) *Attorney, Agent, or Firm* — Rimon P.C.

(57) ABSTRACT

A detection system includes an obtainer, a generator, a classifier, a centroid calculator, associator, and combiner. The obtainer obtains a reception signal from a radio wave sensor. The generator generates a scattered point including positional information of a target, based on the reception signal. The classifier classifies a scattered point group into one or more clusters. The scattered point group is a set of scattered points generated by the generator during a predetermined length of time. The centroid calculator calculates a centroid for each of the one or more clusters classified by the classifier. The associator associates any of the one or more clusters classified by the classifier with the target. The combiner combines, as the scattered point, the centroid (Continued)

calculated by the centroid calculator during a preceding or earlier period with the scattered point group.

13 Claims, 15 Drawing Sheets

(51) Int. Cl.
_G01S 7/41_          (2006.01)
_G01S 13/72_          (2006.01)

(56)                References Cited

U.S. PATENT DOCUMENTS

| | | | |
|---|---|---|---|
| 2014/0022110 A1* | 1/2014 | Itohara | G01S 13/58 |
| | | | 342/107 |
| 2018/0120429 A1* | 5/2018 | Bialer | G01S 7/415 |
| 2018/0277962 A1* | 9/2018 | Kamo | H01P 1/211 |
| 2019/0107615 A1* | 4/2019 | Eljarat | G01S 13/505 |
| 2021/0080558 A1* | 3/2021 | Gosala | G01S 13/931 |

OTHER PUBLICATIONS

Extended European Search Report dated Sep. 16, 2024 for the counterpart European patent application No. 22811114.2.

\* cited by examiner

Figure 4:
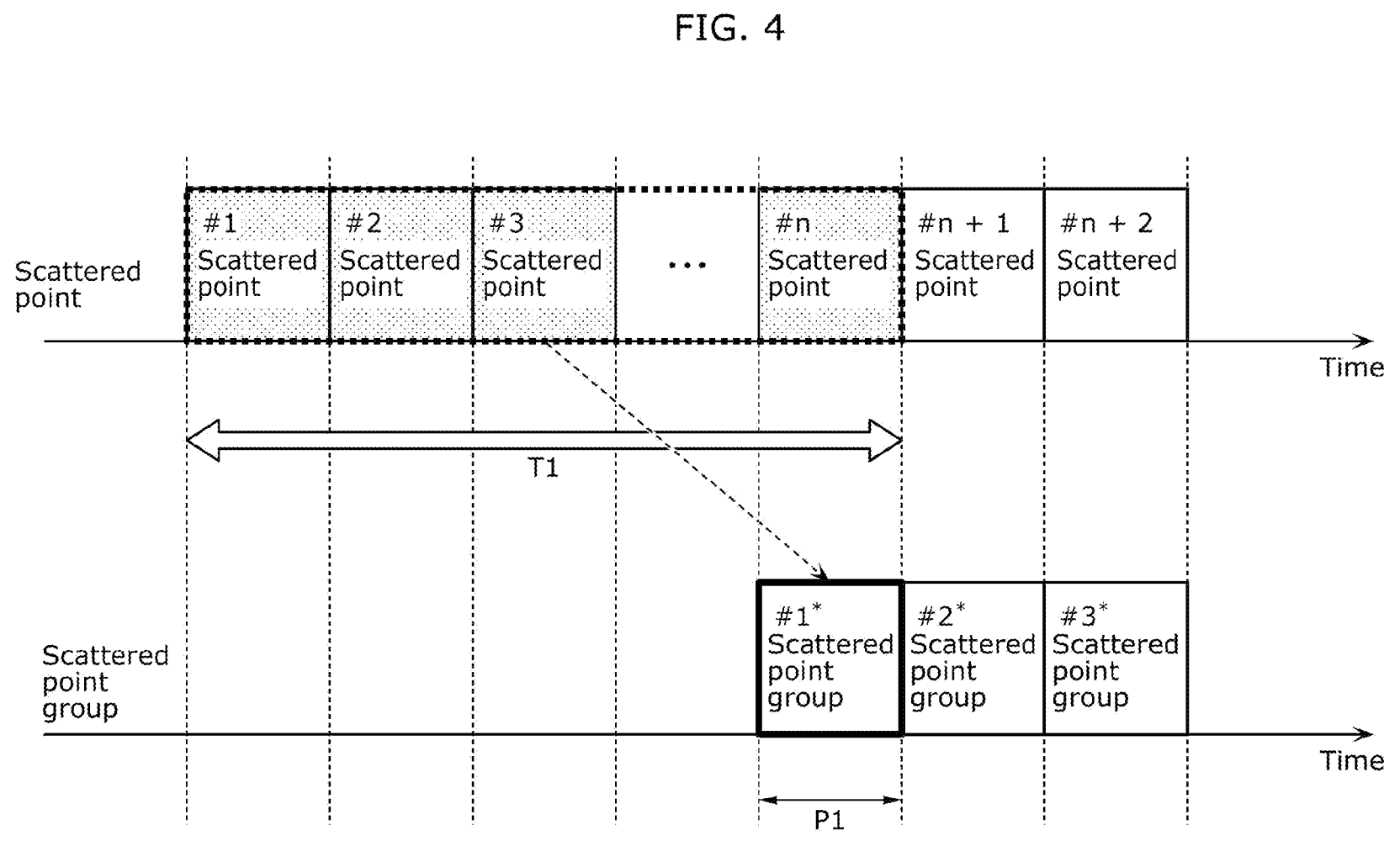

Time

Time

Scattered point

1 Scattered point

2 Scattered point

3 Scattered point

...

n Scattered point n + 1 Scattered point n + 2 Scattered point

T1

Scattered point group

1* Scattered point group

2* Scattered point group

3* Scattered point group

DETECTION SYSTEM, SENSOR SYSTEM, DETECTION METHOD, AND RECORDING MEDIUM

CROSS-REFERENCE OF RELATED APPLICATIONS

This application is the U.S. National Phase under 35 U.S.C. § 371 of International Patent Application No. PCT/JP2022/018974, filed on Apr. 26, 2022, which in turn claims the benefit of Japanese Patent Application No. 2021-088002, filed on May 25, 2021, the entire disclosures of which applications are incorporated by reference herein.

TECHNICAL FIELD

The present invention relates to a detection system, a sensor system, a detection method, and a recording medium that detect a target based on a signal output from a radio wave sensor.

BACKGROUND ART

Patent Literature 1 discloses a Doppler radar system that detects the position of a target object. This Doppler radar system includes a transmitting antenna, a plurality of receiving antennas, a micro-Doppler calculation unit, a first centroid calculation unit, a second centroid calculation unit, and a centroid determination unit. The micro-Doppler calculation unit calculates measurement points indicating respective positions of reflection points included in a target object. The first centroid calculation unit calculates a first centroid of the measurement points, using a first division frame having a first interval. The second centroid calculation unit calculates second centroids of the measurement points, using a second division frame having a second interval shorter than the first interval. Among the second centroids, the centroid determination unit determines at least one of the second centroids as the position of the target object, based on a positional relationship between the second centroids and the first centroid.

CITATION LIST

Patent Literature

[PTL 1] Japanese Unexamined Patent Application Publication No. 2013-96828

SUMMARY OF INVENTION

Technical Problem

The present invention provides a detection system, a sensor system, a detection method, and recording medium that readily improve the accuracy of detecting the position of a target.

Solution to Problem

A detection system according to one aspect of the present invention includes an obtainer, a generator, a classifier, a centroid calculator, an associator, and a combiner. The obtainer obtains a reception signal from a radio wave sensor. The radio wave sensor is a sensor that emits a radio wave from a transmitting antenna to a target and receives a reflected radio wave from the target via a plurality of receiving antennas. The generator generates a scattered point including positional information of the target, based on the reception signal obtained by the obtainer. The classifier classifies a scattered point group into one or more clusters. The scattered point group is a set of scattered points each of which is the scattered point generated by the generator during a predetermined length of time. The centroid calculator calculates a centroid for each of the one or more clusters classified by the classifier. The associator associates any of the one or more clusters classified by the classifier with the target. The combiner combines, as the scattered point, the centroid calculated by the centroid calculator during a preceding or earlier period with the scattered point group.

A sensor system according to one aspect of the present invention includes the above-described detection system and the radio wave sensor controlled by the detection system.

A detection method according to one aspect of the present invention includes obtaining, generating, classifying, calculating, associating, and combining. The obtaining includes obtaining a reception signal from a radio wave sensor. The radio wave sensor is a sensor that emits a radio wave from a transmitting antenna to a target and receives a reflected radio wave from the target via a plurality of receiving antennas. The generating includes generating a scattered point including positional information of the target, based on the reception signal obtained in the obtaining. The classifying includes classifying a scattered point group into one or more clusters. The scattered point group is a set of scattered points each of which is the scattered point generated in the generating during a predetermined length of time. The calculating includes calculating a centroid for each of the one or more clusters classified in the classifying. The associating includes associating any of the one or more clusters classified in the classifying with the target. The combining includes combining, as the scattered point, the centroid calculated in the calculating during a preceding or earlier period with the scattered point group.

A recording medium according to one aspect of the present invention is a non-transitory computer-readable recording medium having recorded thereon a program for causing one or more processors to execute the above-described detection method.

Advantageous Effects of Invention

A detection system, a sensor system, a detection method, and a recording medium according to the present invention have an advantage of readily improving the accuracy of detecting the position of a target.

BRIEF DESCRIPTION OF DRAWINGS

FIG. 1 is a block diagram illustrating an overall configuration including a detection system according to an embodiment.

FIG. 4 is a diagram illustrating scattered point groups to be classified by a classifier of the detection system according to the embodiment.

FIG. 9 is a diagram illustrating a transition of a cluster taken place in the first operation example of the combiner of the detection system according to the embodiment.

FIG. 14 is a block diagram illustrating an overall configuration including a detection system according to a variation of the embodiment.

DESCRIPTION OF EMBODIMENTS

Figure 2:
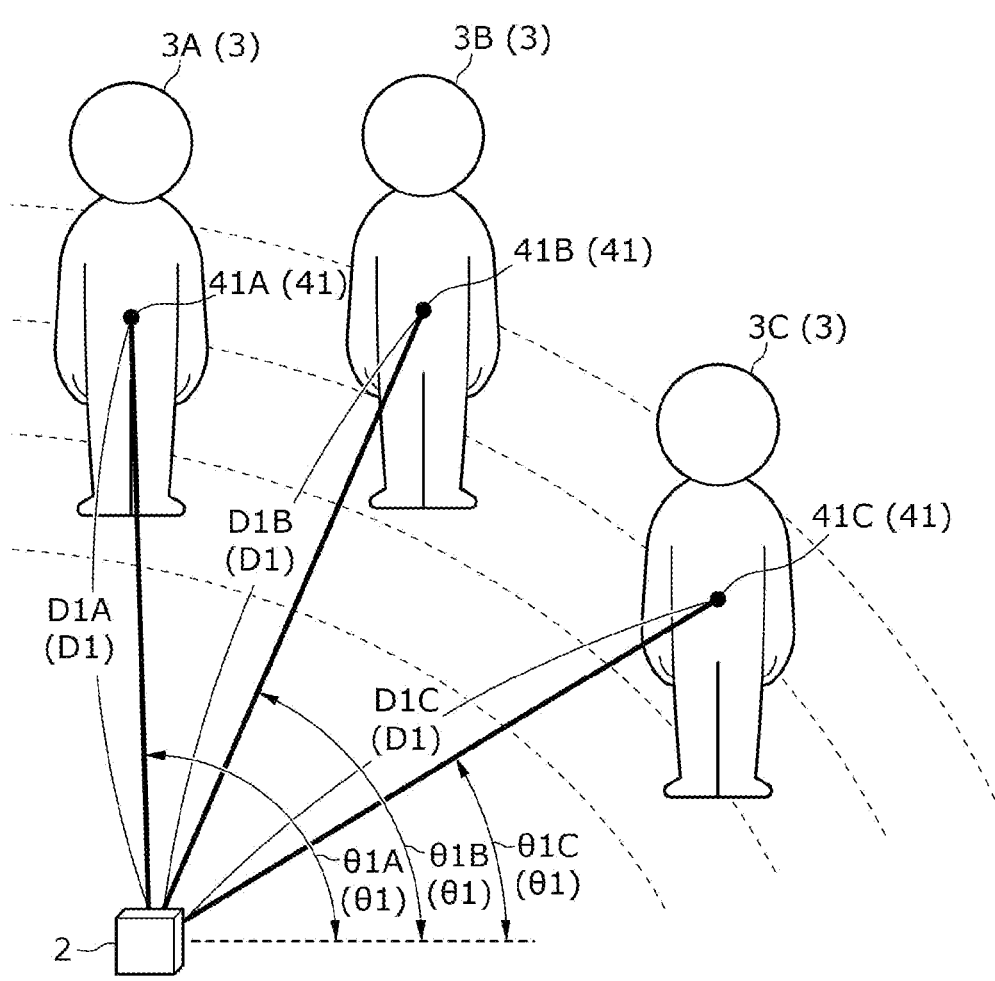
FIG. 2 is a diagram illustrating an overview of detecting a target by a radio wave sensor according to the embodiment.

Underlying Knowledge Forming Basis of the Present Disclosure

First of all, viewpoints of the inventor will be described below.

Conventionally, there is a need for detection of the presence of a person in a space, such as a home or an office where a person is present, without the use of a camera for ensuring privacy. For the purpose of satisfying the above-described need, detection of the presence of a person using a radio wave sensor in a space has been known.

The radio wave sensor is not only capable of detecting a person in a space, but is also capable of obtaining biological information (e.g., respiration or a heart rate) of the detected person in a noncontact manner. As compared to obtaining biological information by a person wearing, for example, a wristwatch-type wearable device, obtaining the biological information in a noncontact manner by the radio wave sensor have advantages that the person would be free from feeling detected and would be less prone to feel discomfort in wearing the wearable device or to experience stress resulting from wearing the wearable device.

In order to simultaneously obtain biological information of several people using one radio wave sensor, the use of a signal separation technique such as beamforming can be considered. When such a signal separation technique is used, accurate identification of sources of the biological information, namely, the positions of respective people is crucial. Particularly when the biological information is to be accurately obtained, stable detection of the positions of respective people is crucial.

In view of the above, the inventor has arrived at designing the present invention.

Hereinafter, embodiments will be described in detail with reference to the drawings. Note that the embodiments below each describe a general or specific example. The numerical values, shapes, materials, elements, the arrangement and connection of the elements, steps, orders of the steps, etc. presented in the embodiments below are mere examples, and are not intended to limit the present invention. Furthermore, among the elements in the embodiments below, those not recited in any one of the independent claims will be described as optional elements.

Note that the drawings are schematic diagrams, and do not necessarily provide strictly accurate illustration. Throughout the drawings, the same numeral is given to substantially the same element, and redundant description may be omitted or simplified.

Embodiment

1. Configuration

Figure 1:
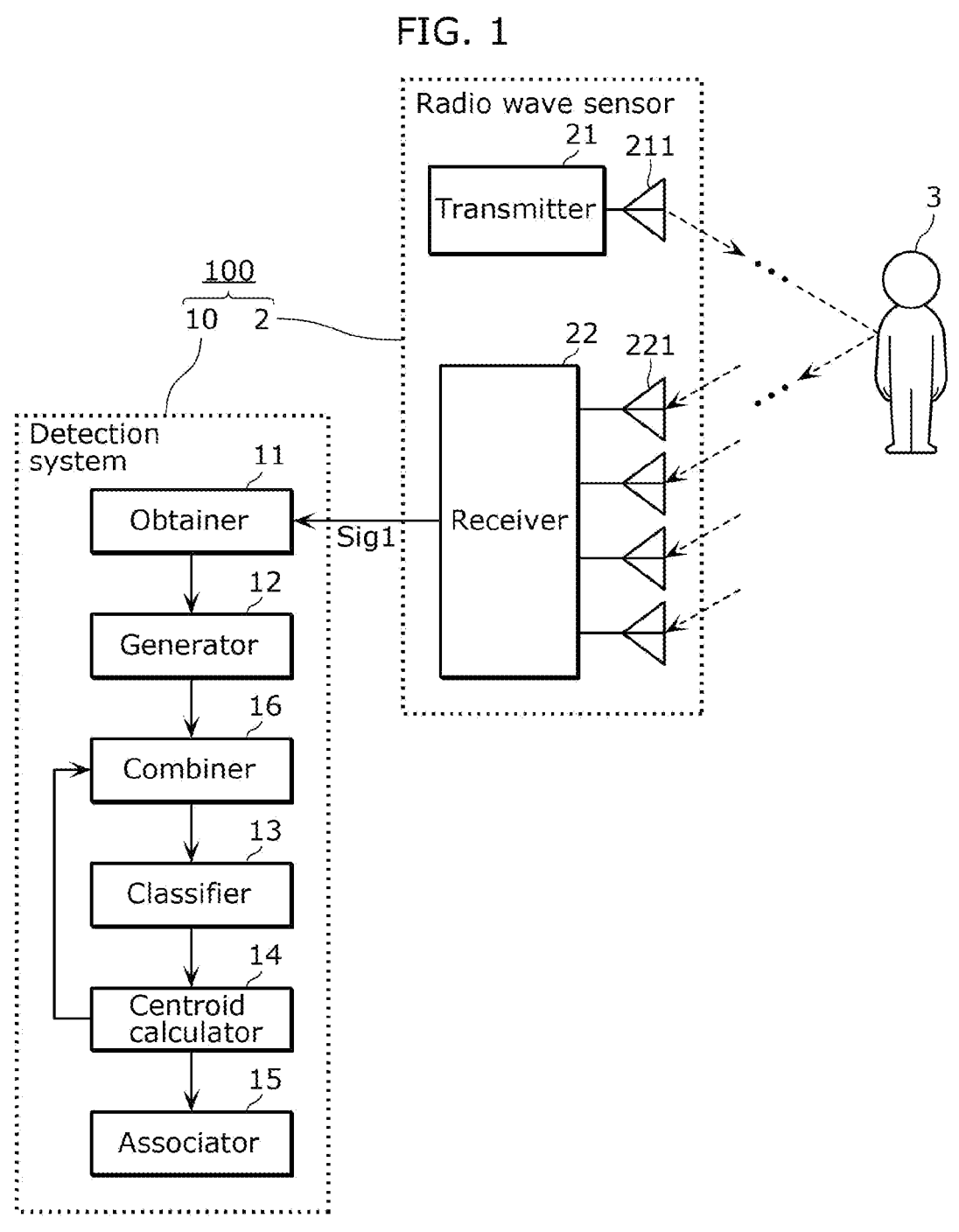

Hereinafter, a configuration of detection system 10 according to an embodiment will be described with reference to FIG. 1. FIG. 1 is a block diagram illustrating an overall configuration including detection system 10 according to the embodiment. Detection system 10 is a system for detecting target 3 based on a signal (reception signal Sig1) output from radio wave sensor 2. In this embodiment, target 3 is a human. Note that as long as target 3 has a form that reflects a radio wave emitted by radio wave sensor 2, target 3 may be a living body other than a human or need not be living body.

Radio wave sensor 2 emits a radio wave from transmitting antenna 211 to target 3, and receives reflected radio waves from target 3 via a plurality of receiving antennas 221. Specifically, radio wave sensor 2 is, for example, a single-input and multiple-output (SIMO) radar, and includes transmitter 21, receiver 22, a single transmitting antenna 211, and a plurality of receiving antennas 221. The plurality of receiving antennas 221 compose an array antenna. Note that radio wave sensor 2 may be a multiple-input and multiple-output (MIMO) radar that includes a plurality of transmitting antennas 211.

Transmitter 21 generates a transmission signal, and outputs the generated transmission signal to transmitting antenna 211. Transmitter 21 is controlled by detection system 10, for example. In response to the reception of the transmission signal output from transmitter 21, transmitting antenna 211 emits the transmission signal as a radio wave.

Here, when target 3 is in a complicated shape having large protrusions and depressions like a human as compared to a wavelength of a radio wave, several points (i.e., reflection points) that satisfy a reflection condition are present on the surface of target 3. The plurality of receiving antennas 221 receive respective reflected radio waves obtained by a radio wave transmitted from transmitting antenna 211 reflecting off reflection points on the surface of target 3. Receiver 22 generates reception signals Sig1 corresponding to the respective reflected radio waves received by the plurality of receiving antennas 221, and output the generated reception signals Sig1 to detection system 10.

In this embodiment, radio wave sensor 2 can switch the operation between a normal mode and a specific mode in which a radio wave is concentratedly emitted in a specific direction or is selectively received. The normal mode is used when radio wave sensor 2 emits radio waves throughout the entire space that is to be detected by radio wave sensor 2 to detect positions of one or more targets 3 in the space. The specific mode is used when radio waves are concentratedly emitted or selectively received to or from a specific target 3 detected in the normal mode using beamforming to obtain biological information (e.g., respiration or a heart rate) of the specific target 3.

Detection system 10 is implemented by a processing circuit including a processor and memory, such as a micro-computer. Specifically, the processor in the processing circuit executing programs stored in the memory implements various functions as detection system 10. Detection system 10 includes, as illustrated in FIG. 1, obtainer 11, generator 12, classifier 13, centroid calculator 14, associator 15, and combiner 16.

Obtainer 11 obtains reception signal Sig1 from radio wave sensor 2. Obtainer 11 is the main performer of obtainment step ST1 in a detection method. In this embodiment, obtainer 11 is connected with an output terminal of radio wave sensor 2 by a signal line. Obtainer 11 obtains, via the signal line, reception signals Sig1 output from the output terminal of radio wave sensor 2 at regular intervals.

Generator 12 generates scattered point 41 including the position information of target 3, based on reception signal Sig1 obtained by obtainer 11. Generator 12 is the main performer of generation step ST2 in the detection method. Here, "generat[ing] scattered point 41" indicates calculation (estimation) of a reflection point on the surface of target 3.

Specifically, generator 12 performs, based on, for example, reception signal Sig1, a process using a technique of a frequency modulated continuous wave radar to calculate distance D1 (see FIG. 2) between target 3 and radio wave sensor 2. In addition, generator 12 performs, based on, for example, reception signal Sig1, a process of estimating an arrival direction by using a reflected radio wave (i.e., reception signal Sig1) received by an array antenna (the plurality of receiving antennas 221) to calculate an arrival angle $\theta1$ (i.e., a direction of target 3 relative to radio wave sensor 2, see FIG. 2) of the reflected radio wave. Generator 12 further measures a received signal strength indicator (RSSI) value of reception signal Sig1, or further extracts a peak value from a result (called a distance spectrum) obtained by performing a fast Fourier transform on reception signal Sig1 in accordance with a principle of a frequency modulated continuous wave radar to measure the strength of the reflected radio wave. In other words, scattered point 41 includes information about the strength of a reflected radio wave and information about at least one of (in this embodiment, both of) (i) a distance between target 3 and radio wave sensor 2 and (ii) a direction of target 3 relative to radio wave sensor 2.

Hereinafter, a specific example of generating scattered point 41 by generator 12 will be described. FIG. 2 is a diagram illustrating an overview of detecting target 3 by radio wave sensor 2 according to the embodiment. Curved dashed lines shown in FIG. 2 denote radio waves transmitted from radio wave sensor 2. In the example shown in FIG. 2, three people (first target 3A, second target 3B, and third target 3C) are present as targets 3 in the detection range covered by radio wave sensor 2.

Generator 12 performs the above-described processes based on reception signals Sig1 to generate respective scattered points 41. Specifically, generator 12 generates first scattered point 41A having distance D1A and arrival angle $\theta1A$ for first target 3A. In addition, generator 12 generates second scattered point 41B having distance D1B and arrival angle $\theta1B$ for second target 3B. Moreover, generator 12 generates third scattered point 41C having distance D1C and arrival angle $\theta1C$ for third target 3C. Note that although first scattered point 41A of first target 3A, second scattered point 41B of second target 3B, and third scattered point 41C of third target 3C each are a single point, there may be multiple points in actuality. In addition, description of the strength of a reflected radio wave of each of scattered points 41A through 41C is omitted.

Figure 3:
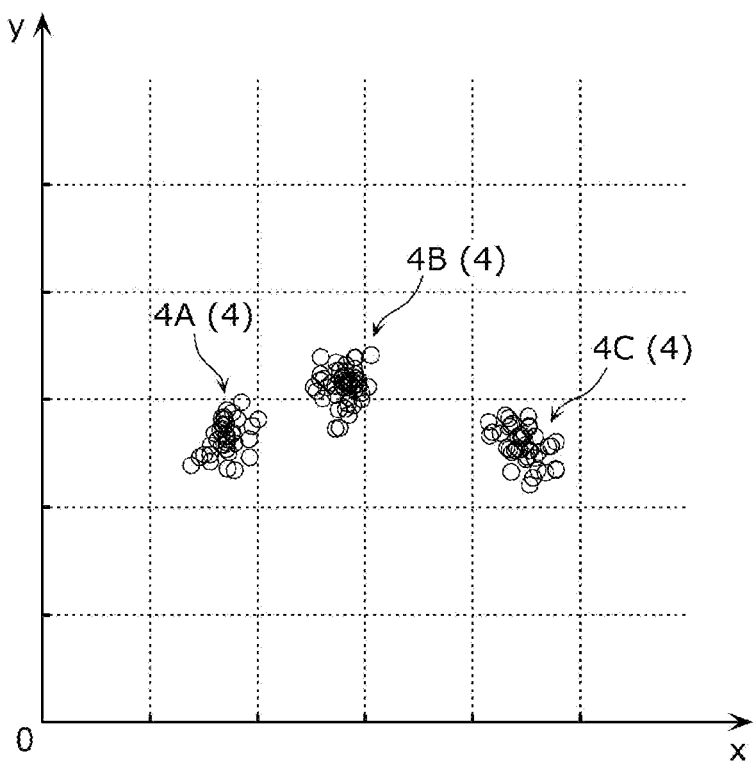
FIG. 3 is a diagram illustrating one example of scattered points generated by a generator of the detection system according to the embodiment.

FIG. 3 is a diagram illustrating one example of scattered points 41 generated by generator 12 of detection system 10 according to the embodiment. Circles shown in FIG. 3 each correspond to scattered point 41 generated by generator 12, and denote plane coordinates (xy coordinates) of scattered point 41 in a plane including radio wave sensor 2 and all of targets 3 and setting radio wave sensor 2 as its origin point. In the example shown in FIG. 3, the position of set 4A of first scattered points 41A approximately corresponds to the position of first target 3A. In addition, the position of set 4B of second scattered points 41B approximately corresponds to the position of second target 3B. Moreover, the position of set 4C of third scattered points 41C approximately corresponds to the position of third target 3C.

Figure 5:
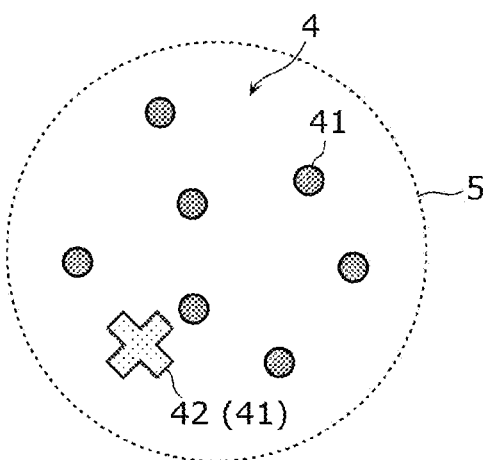
FIG. 5 is a diagram illustrating an overview of a scattered point group to be classified by the classifier of the detection system according to the embodiment.

Classifier 13 classifies scattered point group 4 that is a set of scattered points 41 generated during predetermined length of time T1 by generator 12 into one or more clusters 5 (see FIG. 5). Classifier 13 is the main performer of classification step ST3 in the detection method. For example, when scattered point group 4 includes, as shown in FIG. 3, set 4A of first scattered points 41A, set 4B of second scattered points 41B, and set 4C of third scattered points 41C, classifier 13 classifies these sets 4A through 4C into three respective clusters 5.

FIG. 4 is a diagram illustrating scattered point groups 4 to be classified by classifier 13 of detection system 10 according to the embodiment. In the example shown in FIG. 4, "#1" through "#n (where n is a natural number of two or more)", "#n+1", and "#n+2" each denote a set of scattered points 41 generated by generator 12 for each of frames (e.g., several tenths of a second). Classifier 13 then takes sets of scattered points 41 accumulated during predetermined length of time T1 (here, n frames) as one scattered point group 4, and performs clustering on this scattered point group 4 using a predetermined algorithm.

In the example shown in FIG. 4, "#1*" denotes scattered point group 4 that is the sets of scattered points 41 accumulated in respective n frames of from "#1" through "#n". In addition, "#2*" denotes scattered point group 4 that is the sets of scattered points 41 accumulated in respective n frames of from "#2" through "#n+1". Moreover, "#3*" denotes scattered point group 4 that is the sets of scattered points 41 accumulated in respective n frames of from "#3" through "#n+2". Classifier 13 classifies each of these scattered point groups 4 of "#1*", "#2*", and "#3*" into one or more clusters 5. In other words, classifier 13 classifies scattered point group 4 into one or more clusters 5 for each period P1 (one frame).

In the embodiment, classifier 13 uses an algorithm that eliminates an isolated point based on the density of scattered points 41 to classify scattered point group 4 into one or more clusters 5. Specifically, classifier 13 uses density-based spatial clustering of applications with noise (DBSCAN) to classify scattered point group 4 into one or more clusters 5.

In DBSCAN, when an optional scattered point 41 is the core point, the core point and all reachable points reachable from the core point compose a single cluster 5. In addition, in DBSCAN, scattered point 41 that does not apply to any of the core point and reachable points is an outlier (isolated point). The isolated point is not classified into (i.e., eliminated from) cluster 5. Here, suppose that there is an optional "point p". The "core point" is this "point p" if there are at least "minPts" of points within "distance ε" from the "point p". In addition, the "reachable points" include a point directly reachable from the core point since the point is within "distance ε", and a point reachable from the core point via another core point although the point is not within "distance ε". "Distance ε" and "minPts" each are a parameter that can be appropriately set.

FIG. 5 is a diagram illustrating an overview of scattered point group 4 to be classified by classifier 13 of detection system 10 according to the embodiment. In the example shown in FIG. 5, an area encircled by the dashed line represents cluster 5 classified by classifier 13, and the circles each denote scattered point 41. Moreover, in the example shown in FIG. 5, the cross mark denotes that centroid 42 calculated by centroid calculator 14 during the preceding or an earlier period P1 is included in scattered point group 4 as scattered point 41. Centroid calculator 14 will be described later. Note that a single centroid 42 may be included in scattered point group 4 as scattered point 41, or several centroids 42 may be included in the scattered point group as scattered points 41. When several centroids 42 are included in scattered point group 4, several centroids 42 overlap at one spot.

The phrase "the preceding or an earlier period P1" here indicates, where a period P1 during which classifier 13 has classified scattered point group 4 into one or more clusters 5 is taken as the current period P1, a period P1 that is one or more periods P1 before the current period P1. In the example shown in FIG. 5, the area encircled by the dashed line represents cluster 5 classified during the current period P1, the circles denote scattered points 41 generated during the current period P1, and the cross mark denotes centroid 42 calculated during the preceding period P1.

Note that at a time point at which centroid 42 is not yet calculated by centroid calculator 14, centroid 42 is never included in scattered point group 4 as a matter of course. In other words, scattered point group 4 basically includes centroid 42 as scattered point 41 in periods P1 following the period P1 during which centroid calculator 14 calculated centroid 42.

Centroid calculator 14 calculates centroid 42 for each of one or more clusters 5 classified by classifier 13. Centroid calculator 14 is the main performer of centroid calculation step ST4 in the detection method. Using the plane coordinates (xy coordinates) of each of scattered points 41 (including centroid 42 calculated in the preceding period P1) included in cluster 5 and the strength of a reflected radio wave of each scattered point 41, centroid calculator 14 calculates, for each of one or more clusters 5, the plane coordinates (xy coordinates) of centroid 42 using equations (1) and (2) shown below in this embodiment. Equation (1) shown below is a mathematical expression for calculating the x coordinate of centroid 42, and equation (2) is a mathematical expression for calculating the y coordinate of centroid 42. The letter "p" in both of equations (1) and (2) denotes the strength of a reflected radio wave.

[Math. 1]

$$\bar{x} = \frac{\Sigma(x * p)}{\Sigma p} \tag{1}$$

[Math. 2]

$$\bar{y} = \frac{\Sigma(y * p)}{\Sigma p} \tag{2}$$

Associator 15 associates any of the one or more clusters 5 classified by classifier 13 with target 3. Associator 15 is the main performer of association step ST5 in the detection method. Associator 15 associating the one or more clusters 5 with target 3 causes positions of the associated one or more clusters 5 to be detected as the positions of targets 3.

Figure 6:
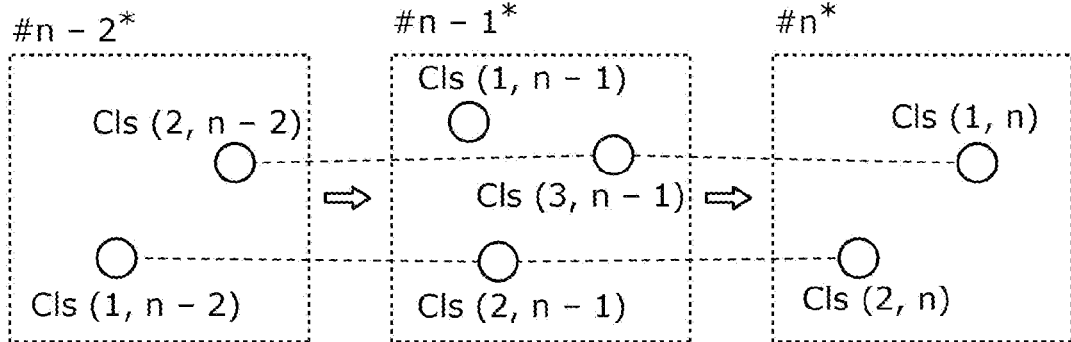
FIG. 6 is a diagram illustrating a basic example of an association between a target and a cluster which is formed by an associator of the detection system according to the embodiment.

FIG. 6 is a diagram illustrating a basic example of an association between target 3 and cluster 5 which is formed by associator 15 of detection system 10 according to the embodiment. FIG. 6 shows a result of classification made by classifier 13 when two people (targets 3) are present in the detection range covered by radio wave sensor 2. Note that in the example shown in FIG. 6, the two people (targets 3) are assumed to be stationary and practically not moving.

In FIG. 6, the letter "a" in "Cls (a, b)" denotes a cluster number optionally given by classifier 13 and the letter "b" denotes a period P1. In the example shown in FIG. 6, the following clusters 5 are approximately at the same position: Cls (1, n−2) that is cluster 5 at the lower left in the n−2th period P1, Cls (2, n−1) that is cluster 5 at the lower left in the n−1th period P1, and Cls (2, n) that is cluster 5 at the lower left in the nth period P1. For this reason, associator 15 associates clusters 5 at the lower left with one person (target 3) of the two people.

In addition, in the example shown in FIG. 6, the following clusters 5 are approximately at the same position: Cls (2, n−2) that is cluster 5 at the upper right in the n−2th period P1, Cls (3, n−1) that is cluster 5 at the upper right in the n−1th period P1, and Cls (1, n) that is cluster 5 at the upper right in the nth period P1. For this reason, associator 15 associates clusters 5 at the upper right with the other person (target 3) of the two people.

Note that in the example shown in FIG. 6, Cls (1, n−1) that is cluster 5 at the upper left in the n−1th period P1 is not present in the n−2th period P1 and the nth period P1. For this reason, associator 15 does not associate the above-described cluster 5 with targets 3.

In the embodiment, associator 15 associates any of one or more clusters 5 with target 3, based on whether centroid 42 calculated during the preceding or an earlier period P1 is included in one or more clusters 5 classified by classifier 13.

Figure 7:
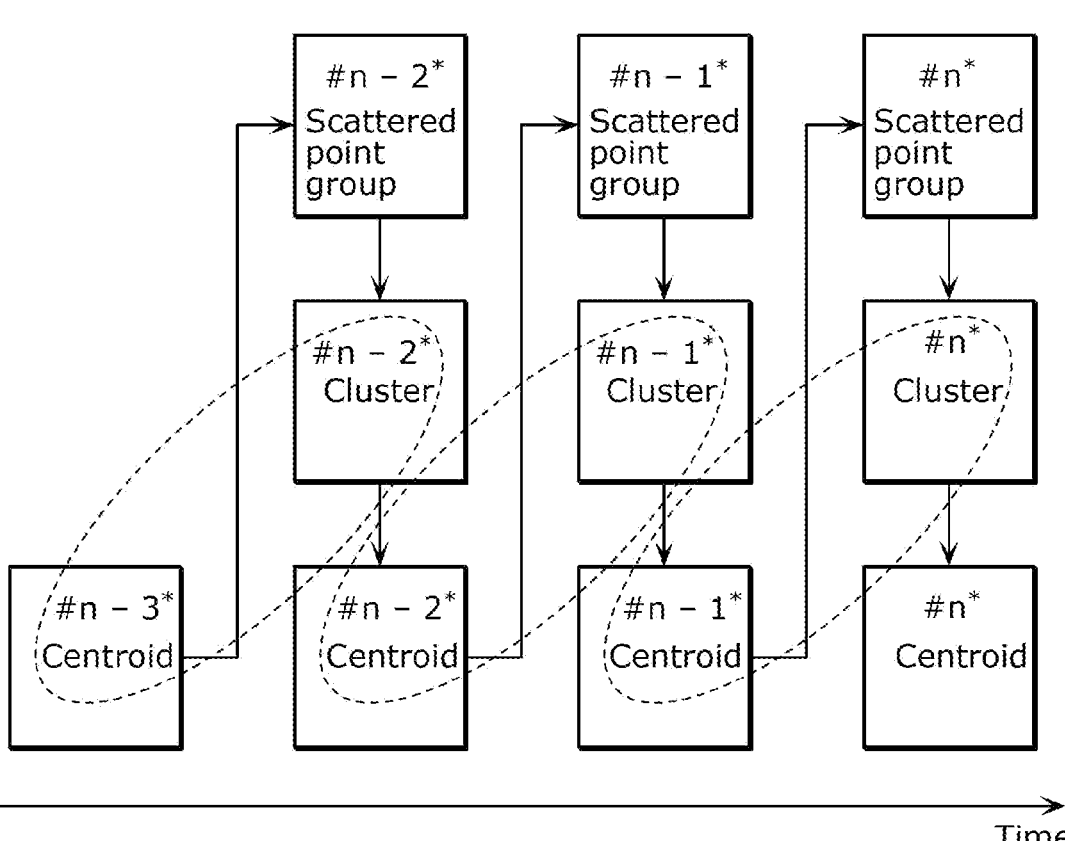
FIG. 7 is a diagram illustrating an association between a target and a cluster which is formed by the associator of the detection system according to the embodiment.

FIG. 7 is a diagram illustrating an association between target 3 and cluster 5 which is formed by associator 15 of detection system 10 according to the embodiment. Each of the columns shown in FIG. 7 indicates a flow in which classifier 13 classifies scattered point group 4 into one or more clusters 5 and centroid calculator 14 calculates centroid 42 for each of the one or more clusters 5 during a period P1. In addition, areas surrounded by dashed-line ellipses shown in FIG. 7 each indicate a process of determining whether Cls (α, n) that is cluster 5 classified during the current period P1 includes G (β, n−1) that is centroid 42 of Cls (β, n−1) that is cluster 5 classified during the preceding period P1. Note that "a" and "B" each denote a cluster 5 number that is optionally given by classifier 13, and "n" and "n−1" each denote a period P1.

When Cls (α, n) includes G (β, n−1), associator 15 determines that Cls (α, n) that is cluster 5 classified during the current period P1 and Cls (β, n−1) that is cluster 5 classified during the preceding period P1 derive from the same target 3. In other words, associator 15 can capture target 3 by associating the current cluster 5 with a past cluster 5. Note that when Cls (α, n) does not include G (β, n−1), associator 15 determines that Cls (α, n) that is cluster 5 classified during the current period P1 and Cls (β, n−1) that is cluster 5 classified during the preceding period P1 derive from mutually different targets 3.

Combiner 16 combines (includes), as scattered point 41, centroid 42 that was calculated by centroid calculator 14 during the preceding or an earlier period P1 with scattered point group 4. Combiner 16 is the main performer of combination step ST6 in the detection method. As has been shown in the above-described FIG. 5, combiner 16 combines, as one or more scattered points 41, one or more centroids 42 calculated by centroid calculator 14 during the preceding or an earlier period P1 with a set of scattered points 41 generated by generator 12 during the current period P1.

In the embodiment, combiner 16 adjusts the combination amount or delay amount of centroid 42 that was calculated during the preceding or an earlier period P1 and is to be combined with scattered point group 4. Here, the "combination amount of centroid 42" indicates the number of centroids 42 to be combined with a set of scattered points 41. In other words, combiner 16 adjusts whether to combine one centroid 42 or several centroids 42 with a set of scattered points 41 generated during the current period P1.

Here, the "delay amount of centroid 42" indicates how much earlier period P1 is the period P1 during which centroid 42 to be combined with the set of scattered points 41 was calculated. In other words, combiner 16 adjusts whether to combine (i) centroid 42 calculated during the preceding period P1 or (ii) centroid 42 calculated during a period P1 before the preceding period P1 with the set of scattered points 41 generated during the current period P1.

Combiner 16 adjusting the combination amount or delay amount of centroid 42 that was calculated during the preceding or an earlier period P1 and is to be combined with scattered point group 4 can readily associate the current cluster 5 with a past cluster 5 and can reduce the change in the position of cluster 5 with the passage of time.

Particularly, classifier 13 classifies scattered point group 4 into one or more clusters 5 using DBSCAN in this embodiment. For this reason, combiner 16 adjusts the number (combination amount) of centroids 42 to be included in scattered point group 4 such that the core point would not disappear (i.e., such that the core point would not be an isolated point) to prevent the disappearance of cluster 5. As a consequence, target 3 can be continuously captured.

Hereinafter, a first operation example through a third operation example of operation performed by combiner 16 will be enumerated. In the embodiment, combiner 16 applies one of the first operation example and the second operation example, and the third operation example, but may apply any one of these operation examples. Moreover, operation examples of combiner 16 described below are mere examples. Accordingly, combiner 16 may apply other operation examples.

In the first operation example, combiner 16, for each of one or more clusters 5, increments a counter when cluster 5 does not include scattered point 41 other than centroid 42, and resets the counter when cluster 5 includes scattered point 41 other than centroid 42. When the counter reaches threshold (first threshold) Th1, combiner 16 discards centroid 42 (i.e., avoids inclusion of centroid 42 in scattered point group 4 as scattered point 41). With this, cluster 5 that continuously remains without the presence of scattered point 41 vanishes when the counter reaches threshold Th1.

Figure 8:
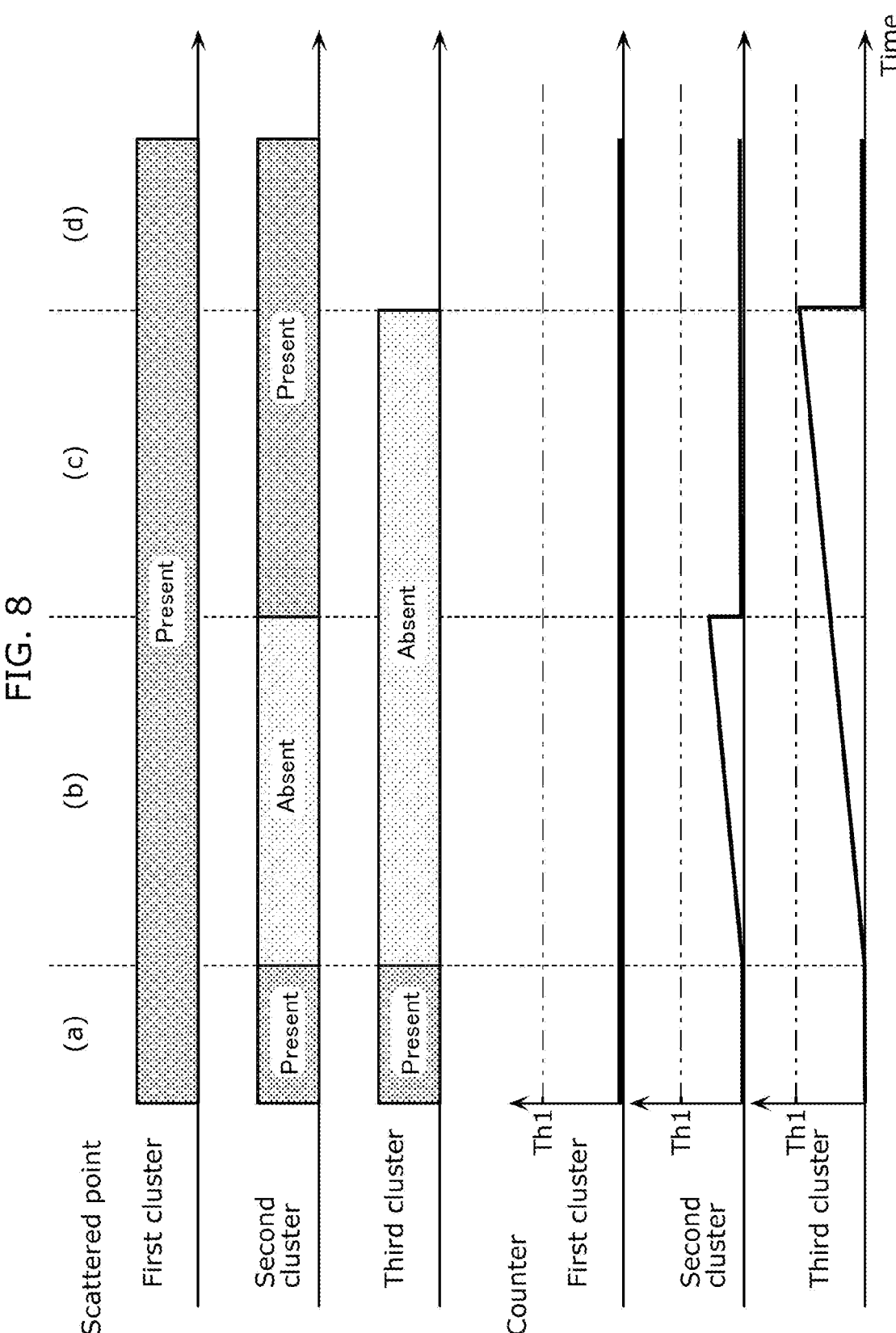
FIG. 8 is a diagram illustrating a first operation example of a combiner of the detection system according to the embodiment.
Figure 9:
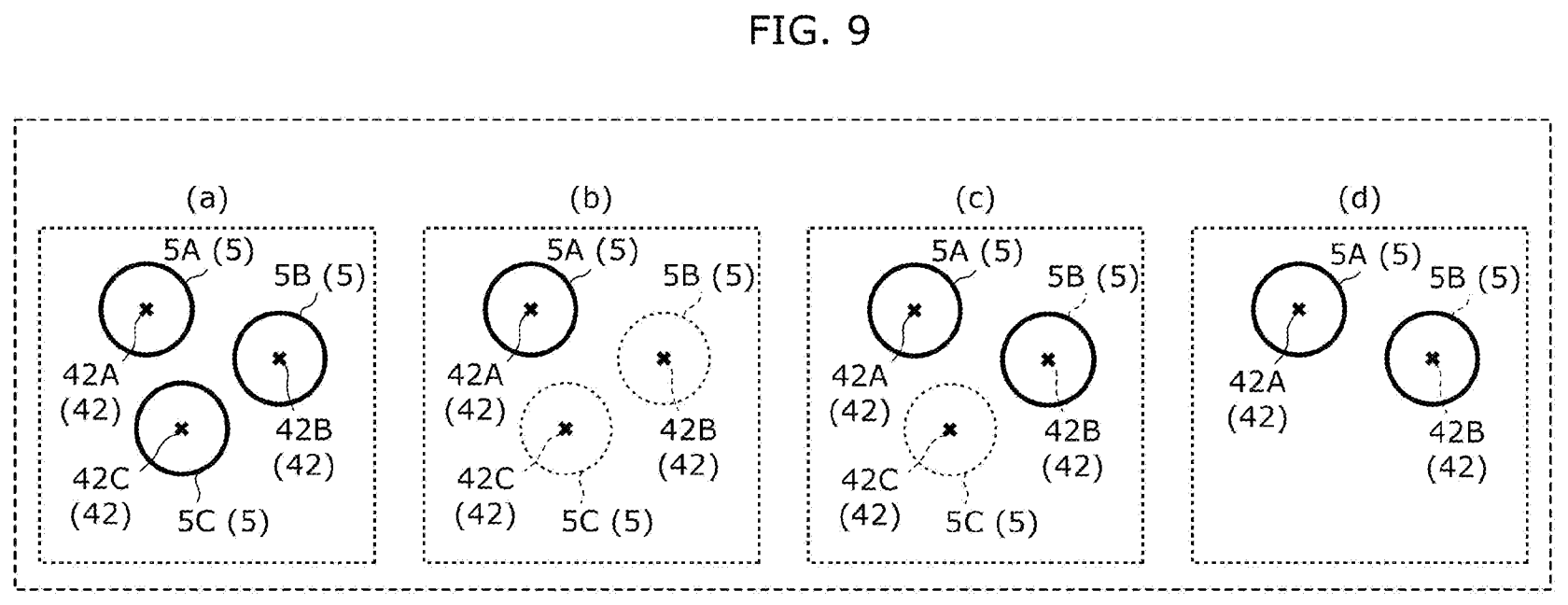

Hereinafter, the first operation example will be described with reference to FIG. 8 and FIG. 9. FIG. 8 is a diagram illustrating the first operation example of combiner 16 of detection system 10 according to the embodiment. FIG. 9 is a diagram illustrating a transition of cluster 5 taken place in the first operation example of combiner 16 of detection system 10 according to the embodiment. FIG. 8 includes (a), (b), (c), and (d) that correspond to (a), (b), (c), and (d) in FIG. 9, respectively. In FIG. 9, each of areas encircled by the solid line denotes that cluster 5 includes both scattered point 41 and centroid 42, and each of areas encircled by the dashed line denotes that cluster 5 includes centroid 42, but does not include scattered point 41. Note that FIG. 9 omits illustration of scattered point 41.

In the state of (a), classifier 13 classifies scattered point group 4 into three clusters 5 (first cluster 5A, second cluster 5B, and third cluster 5C). In this state, each of clusters 5A through 5C includes scattered point 41. Accordingly, combiner 16 does not increment any of the counters corresponding to respective clusters 5A through 5C.

In the state of (b), first cluster 5A still includes scattered point 41, but scattered point 41 has disappeared from both of second cluster 5B and third cluster 5C. For this reason, combiner 16 increments the counter corresponding to each of second cluster 5B and third cluster 5C. Note that the counters are incremented for each period P1.

In the state of (c), scattered point 41 that has been temporarily disappeared from second cluster 5B has reappeared. In contrast, scattered point 41 is still disappeared from third cluster 5C. For this reason, combiner 16 resets the counter corresponding to second cluster 5B. In contrast, combiner 16 continuously increments the counter corresponding to third cluster 5C.

In the state of (d), the counter corresponding to third cluster 5C has reached threshold (first threshold) Th1. For this reason, combiner 16 discards centroid 42 corresponding to third cluster 5C. In other words, combiner 16 adjusts the combination amount of centroid 42 so as to avoid the inclusion of centroid 42 in third cluster 5C as scattered point 41. With this, third cluster 5C disappears since neither scattered point 41 nor centroid 42 are present in third cluster 5C.

As has been described above, the first operation example can prevent cluster 5 that corresponds to target 3 from continuously remaining regardless of the absence of scattered point 41, or in other words, the absence of target 3. Consequently, the first operation example has an advantage of readily improving the accuracy of detecting target 3.

In the second operation example, combiner 16, for each of one or more clusters 5, reduces the combination amount of centroid 42 when cluster 5 does not include scattered point 41 other than centroid 42, and restores the combination amount of centroid 42 when cluster 5 includes scattered point 41 other than centroid 42. With this, when the number of centroids 42 falls below threshold (second threshold) Th2 that corresponds to "minPts" in DBSCAN as a result of a reduction in the combination amount of centroid 42, cluster 5 that continuously remains without the presence of scattered point 41 vanishes along with the disappearance of the core point.

Figure 10:
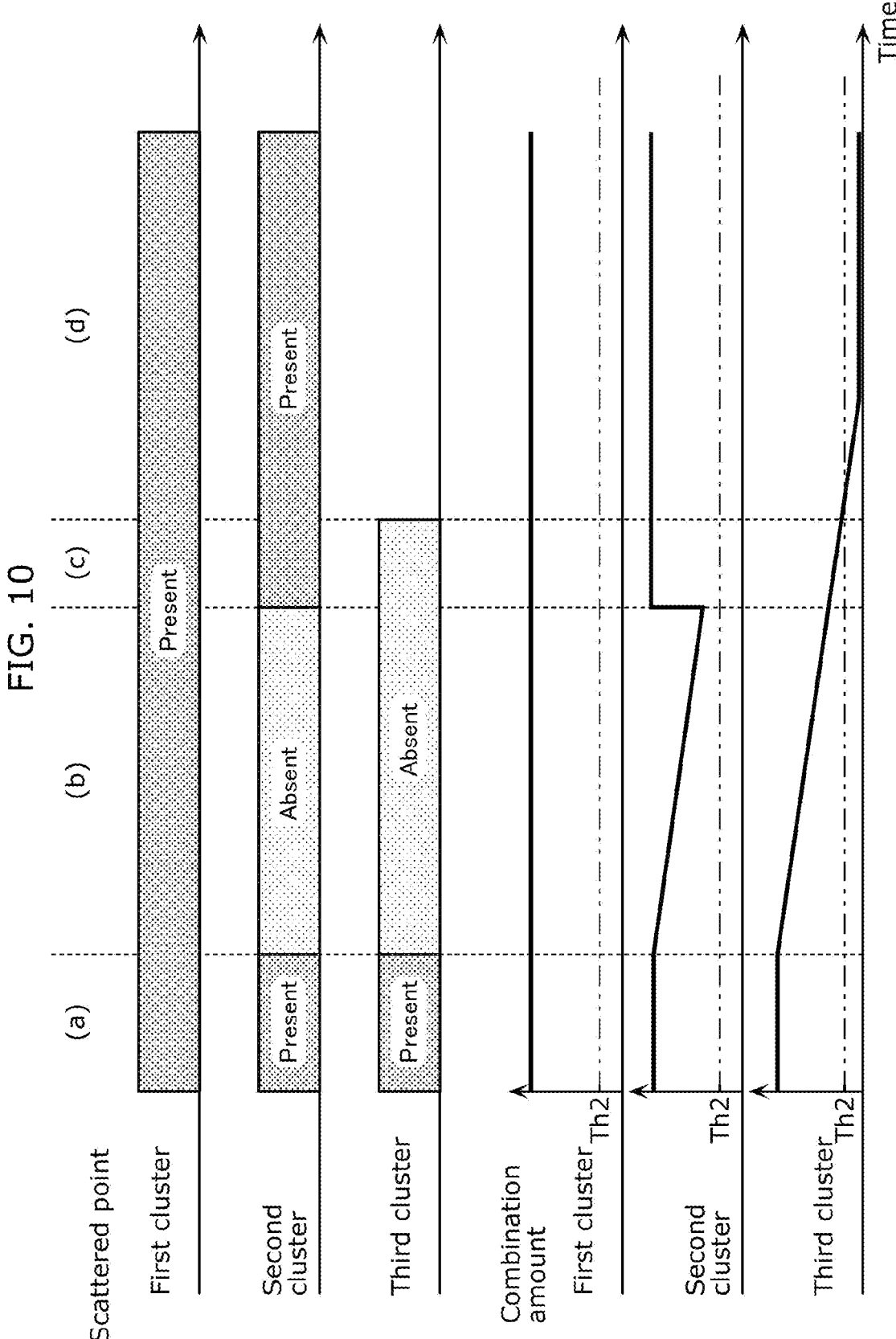
FIG. 10 is a diagram illustrating a second operation example of the combiner of the detection system according to the embodiment.

Hereinafter, the second operation example will be described with reference to FIG. 9 and FIG. 10. FIG. 10 is a diagram illustrating the second operation example of combiner 16 of detection system 10 according to the embodiment. FIG. 10 includes (a), (b), (c), and (d) that correspond to (a), (b), (c), and (d) in FIG. 9, respectively.

In the state of (a), each of clusters 5A through 5C includes scattered point 41. Accordingly, combiner 16 does not reduce any of the combination amounts of centroid 42 corresponding to respective clusters 5A through 5C.

In the state of (b), first cluster 5A still includes scattered point 41, but scattered point 41 has disappeared from both of second cluster 5B and third cluster 5C. For this reason, combiner 16 reduces the combination amount of centroid 42 corresponding to each of second cluster 5B and third cluster 5C. Note that the amount of centroid 42 is reduced for each period P1.

In the state of (c), scattered point 41 that has been temporarily disappeared from second cluster 5B has reappeared. In contrast, scattered point 41 is still disappeared from third cluster 5C. For this reason, combiner 16 restores the combination amount of centroid 42 corresponding to second cluster 5B. In contrast, combiner 16 continuously reduces the combination amount of centroid 42 corresponding to third cluster 5C.

In the state of (d), the combination amount of centroid 42 corresponding to third cluster 5C has reached threshold (second threshold) Th2. With this, the core point disappears from third cluster 5C, and thus third cluster 5C disappears.

As has been described above, the second operation example can prevent cluster 5 that corresponds to target 3 from continuously remaining regardless of the absence of scattered point 41, or in other words, the absence of target 3. Consequently, the second operation example has an advantage of readily improving the accuracy of detecting target 3.

In the third operation example, combiner 16 increases the combination amount of centroid 42 when radio wave sensor 2 is operating in the specific mode, as compared to when radio wave sensor 2 is operating in the normal mode. With this, cluster 5 can be readily dependent on the position of centroid 42 when radio wave sensor 2 is operating in the specific mode, as compared to when radio wave sensor 2 is operating in the normal mode.

Figure 11:
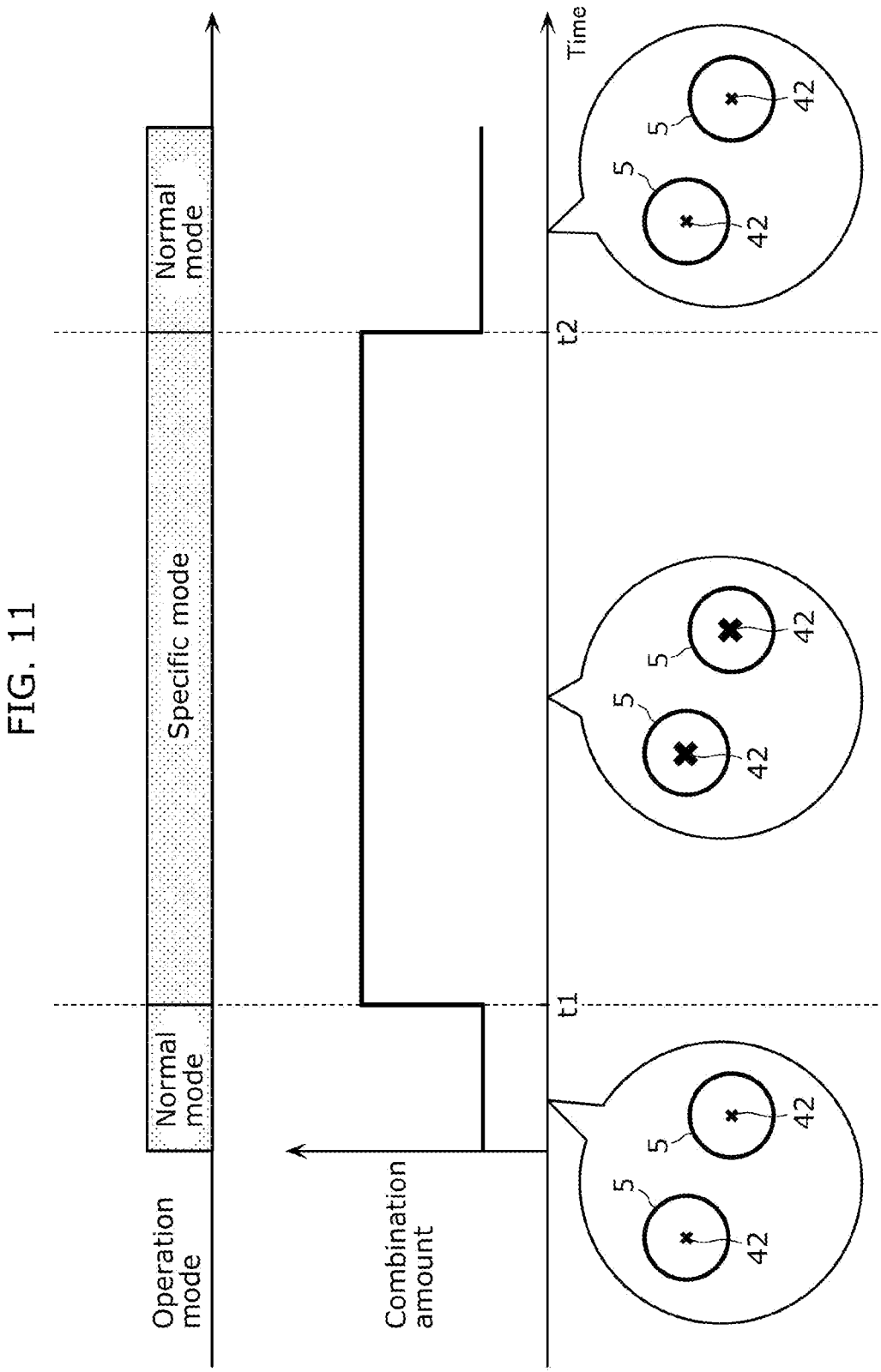
FIG. 11 is a diagram illustrating a third operation example of the combiner of the detection system according to the embodiment.

Hereinafter, the third operation example will be described with reference to FIG. 11. FIG. 11 is a diagram illustrating the third operation example of combiner 16 of detection system 10 according to the embodiment. In FIG. 11, the size of the cross mark indicating centroid 42 indicates the magnitude of the combination amount of centroid 42. In other words, the size of the cross mark indicating centroid 42 increases for a larger combination amount of centroid 42 (i.e., for a larger number of centroids 42).

In the third operation example, detection system 10 switches the operation mode of radio wave sensor 2 from the normal mode to the specific mode, when detection system 10 determines that a variation in the detection position of target 3 is small. The state in which a variation in the detection position of target 3 is small may occur when a person (target 3) is sleeping, for example. For example, when the number of scattered points 41 in cluster 5 that corresponds to target 3 falls below a threshold, detection system 10 switches the operation mode of radio wave sensor 2 from the normal mode to the specific mode. Alternatively, when the number of scattered points 41 in cluster 5 that corresponds to target 3 exceeds the threshold, detection system 10 switches the operation mode of radio wave sensor 2 from the specific mode to the normal mode. In addition, when the degree of stability of the strength of a reflected radio wave exceeds a threshold, detection system 10 may switch the operation mode of radio wave sensor 2 from the normal mode to the specific mode. Alternatively, when the degree of stability of the strength of a reflected radio wave falls below the threshold, detection system 10 may switch the operation mode of radio wave sensor 2 from the specific mode to the normal mode.

As has been described above in the third operation example, it is unlikely that the position of cluster 5, in other words, the detection position of target 3, varies since the number of centroids 42 to be included in cluster 5 is large when radio wave sensor 2 operates in the specific mode. For this reason, radio waves can be readily and concentratedly emitted or readily and selectively received to or from target 3 using beamforming. Consequently, the third operation example has an advantage of readily obtaining biological information of target 3.

2. Operation

Figure 12:
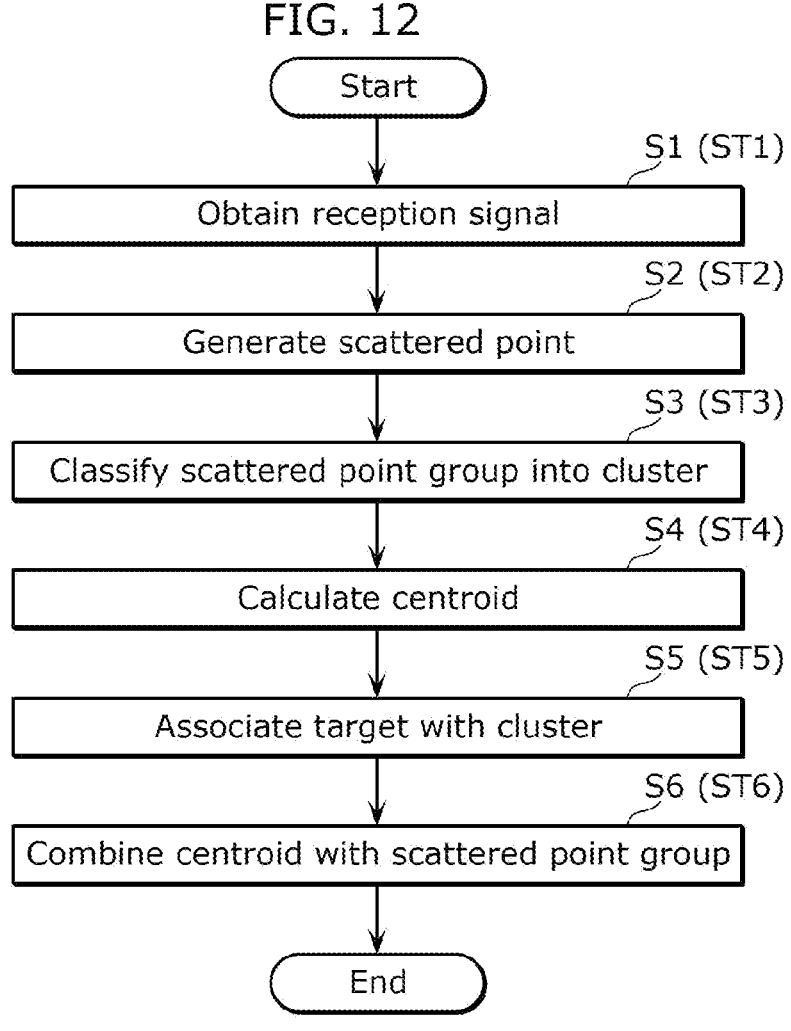
FIG. 12 is a flowchart illustrating an operation example of the detection system according to the embodiment.

Hereinafter, one example of operation performed by detection system 10 will be described with reference to FIG. 12. FIG. 12 is a flowchart illustrating an operation example of detection system 10 according to the embodiment.

First, obtainer 11 obtains reception signals Sig1 output from radio wave sensor 2 at regular intervals (S1). Process S1 corresponds to obtainment step ST1 in the detection method. Next, generator 12 generates scattered points 41 based on reception signals Sig1 obtained by obtainer 11 (S2). Process S2 corresponds to generation step ST2 in the detection method.

Next, classifier 13 classifies scattered point group 4 that is a set of scattered points 41 generated during predetermined length of time T1 (e.g., n frames) by generator 12 into one or more clusters 5 (S3). Process S3 corresponds to classification step ST3 in the detection method. Here, if centroid calculator 14 has calculated centroid 42 during the preceding or an earlier period P1, scattered point group 4 includes this centroid 42 as will be described later. Next, centroid calculator 14 calculates centroid 42 for each of the one or more clusters 5 classified by classifier 13 (S4). Process S4 corresponds to centroid calculation step ST4 in the detection method.

Next, associator 15 associates any of the one or more clusters 5 classified by classifier 13 with target 3 (S5). Process S5 corresponds to association step ST5 in the detection method. Here, if centroid calculator 14 calculates centroid 42 that was calculated during the preceding or an earlier period P1, associator 15 associates any of the one or more clusters 5 with target 3 based on whether the aforementioned centroid 42 is included in the one or more clusters 5 classified during the current period P1.

Combiner 16 combines, as scattered point 41, centroid 42 calculated by centroid calculator 14 during the preceding or an earlier period P1 with scattered point group 4 (S6). Process S6 corresponds to combination step ST6 in the detection method. Note that the order of processes S5 and S6 may be reversed, or may be performed in parallel. The above processes S1 through S6 will be repeated hereafter.

3. Advantage

As has been described above, detection system 10 according to the embodiment performs clustering including centroid 42 that was calculated by centroid calculator 14 during the preceding or an earlier period P1. For this reason, detection system 10 according to the embodiment can readily associate a past cluster 5 with the current cluster 5, and thus target 3 is readily captured. Consequently, detection system 10 has an advantage of readily improving the accuracy of detecting the position of target 3.

Here, whether a past cluster and the current cluster derive from the same target may be determined based on the following: (i) a distance between the centroid of a past cluster and the centroid of the current cluster, (ii) a distance between the current cluster and the centroid of the past cluster, (iii) a distance between the past cluster and the centroid of the current cluster, or (iv) a degree of similarity between the past cluster and the current cluster. However, the above-described determination may provide significantly different results according to how the distances or the degree of similarity are set. This results in the lack of stability in associations.

To address the above matter, detection system 10 according to the embodiment includes associator 15 that associates any of one or more cluster 5 with target 3 based on whether centroid 42 calculated during the preceding or an earlier period P1 is included in one or more clusters 5 classified by classifier 13. For this reason, detection system 10 according to the embodiment can even more readily associate a past cluster 5 with the current cluster 5. Consequently, detection system 10 has an advantage of even more readily capturing target 3.

Figure 13A:
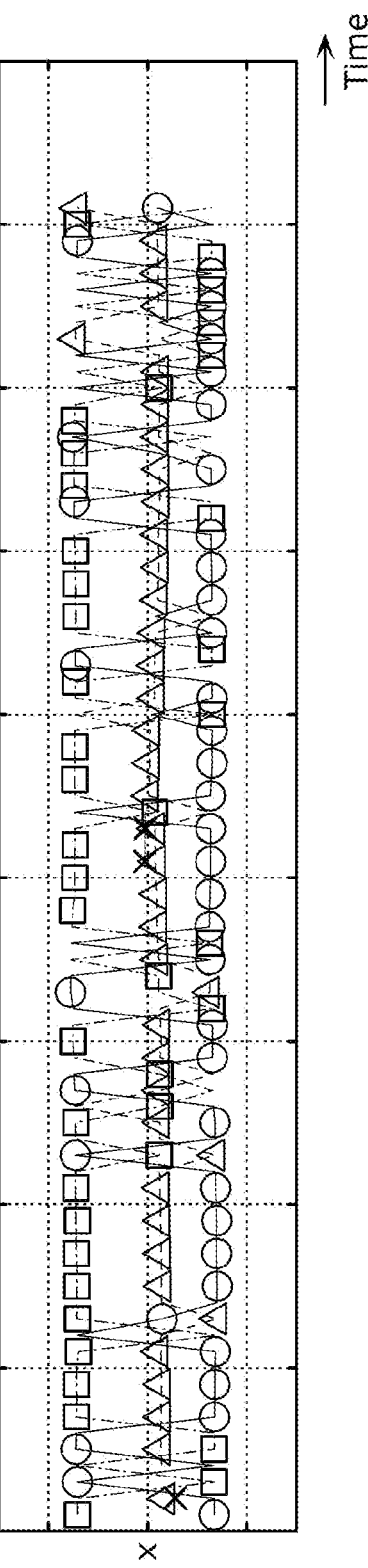
FIG. 13A is a diagram illustrating one example of a detection result obtained by a detection system according to a comparative example.
Figure 13B:
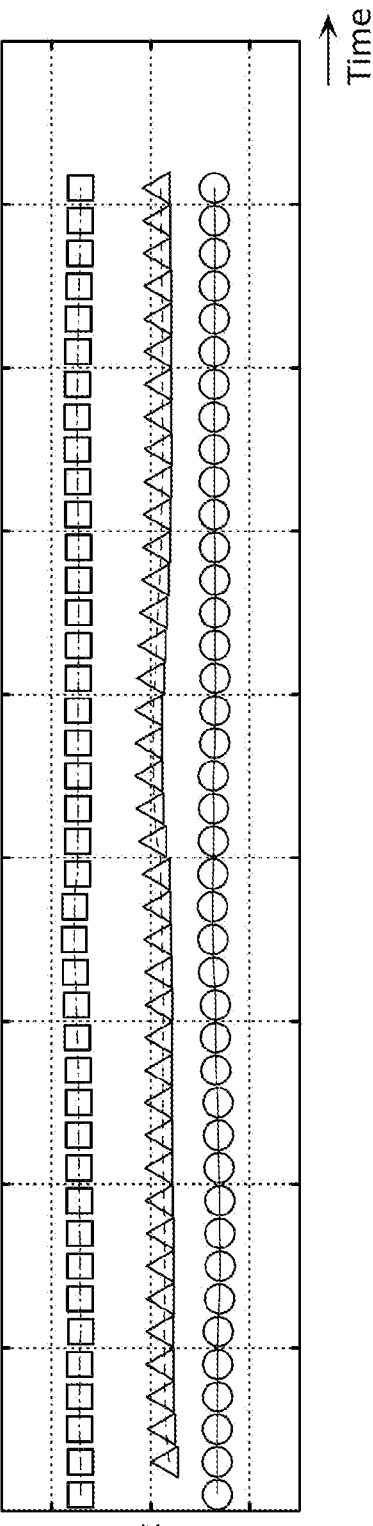
FIG. 13B is a diagram illustrating one example of a detection result obtained by the detection system according to the embodiment.

Hereinafter, advantages of detection system 10 according to the embodiment will be described with reference to FIG. 13A and FIG. 13B. FIG. 13A is a diagram illustrating one example of a detection result obtained by a detection system according to a comparative example. FIG. 13B is a diagram illustrating one example of a detection result obtained by detection system 10 according to the embodiment. In both of FIG. 13A and FIG. 13B, the vertical axis represents the plane coordinate (here, the x coordinate) of centroid 42 of cluster 5, and the horizontal axis represents time. In addition, both of FIG. 13A and FIG. 13B include the square mark, the triangle mark, and the circle mark that denote three mutually different targets 3. Note that the cross mark does not correspond to any of targets 3.

The detection system according to the comparative example is different from detection system 10 according to the embodiment in that the detection system does not include combiner 16 and does not form an association based on whether one or more clusters 5 include centroid 42 calculated during the preceding or an earlier period P1. As illustrated in FIG. 13A, the x coordinates of targets 3 corresponding to the square mark, the triangle mark, and the square mark are all unstable, and targets 3 are not captured in the detection system according to the comparative example. In contrast, the x coordinates of targets 3 corresponding to the square mark, the triangle mark, and the square mark are all stable, and targets 3 are captured in detection system 10 according to the embodiment.

[Variation]

The embodiment has been hereinbefore described, yet the present invention is not limited to the above-described embodiment. Hereinafter, variations of the embodiment will be enumerated. The variations described below may be appropriately combined.

Figure 14:
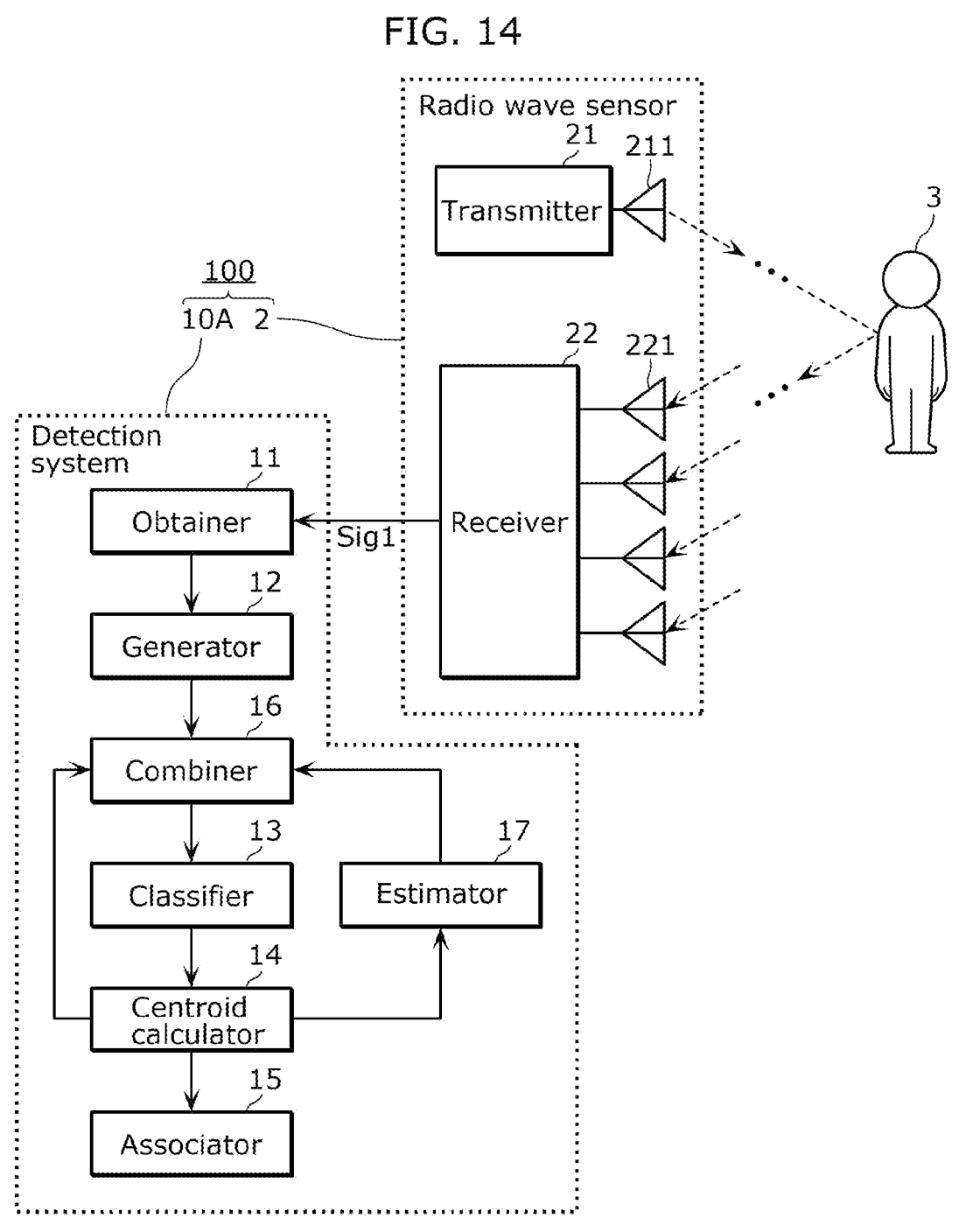

In the embodiment, detection system 10A may further include estimator 17 as illustrated in FIG. 14. FIG. 14 is a block diagram illustrating an overall configuration including detection system 10A according to a variation of the embodiment.

Estimator 17 estimates centroid 43 to be calculated during the following or a later period P1 for each of one or more clusters 5 classified by classifier 13. Specifically, estimator 17 estimates centroid 43 to be calculated during the following period P1 using, for example, an α-β filter or the Kalman filter for time-series data of centroids 42 calculated by centroid calculator 14 during the current and preceding periods P1.

Figure 15:
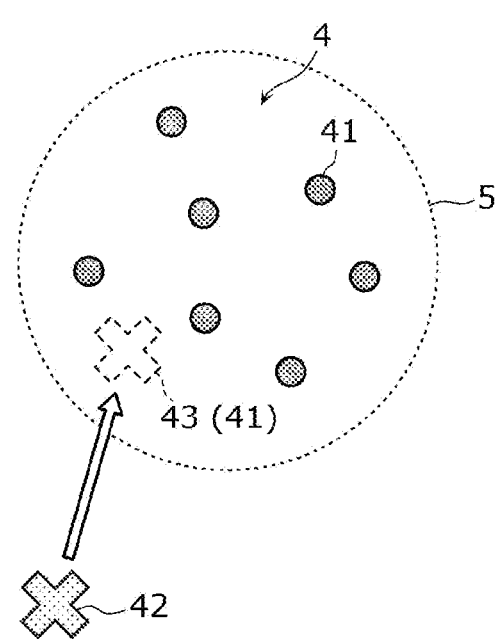
FIG. 15 is a diagram illustrating an overview of a scattered point group to be classified by a classifier of the detection system according to the variation of the embodiment.

In detection system 10A, combiner 16 then combines, as scattered point 41, centroid 43 that is to be calculated during the following or a later period P1 and is estimated by estimator 17 with scattered point group 4. FIG. 15 is a diagram illustrating an overview of scattered point group 4 to be classified by classifier 13 of detection system 10A according to the variation of the embodiment. The example in FIG. 15 shows that centroid 43 that is denoted by the dashed-line cross mark and is to be calculated during the following period P1 is estimated based on centroid 42 that is denoted by the solid-line cross mark and is calculated during the current period P1, and that the estimated centroid 43 is included in scattered point group 4 as scattered point 41.

As has been described above, clustering of scattered point group 4 is performed including centroid 43 that is to be calculated during the following or a later period P1 and is estimated by estimator 17 in detection system 10A. With this, target 3 can be detected by estimating the future position of target 3. For this reason, detection system 10A has an advantage of readily and accurately detecting the position of target 3 even if target 3 is moving.

In the embodiment, radio wave sensor 2 can switch the operation between the normal mode and the specific mode, but radio wave sensor 2 is not limited to the foregoing. For example, radio wave sensor 2 may be configured such that radio wave sensor 2 operates only in the normal mode. In this case, combiner 16 is not applicable to the third operation example.

In the example, classifier 13 uses DBSCAN as an algorithm for clustering, but the algorithm is not limited to the foregoing. For example, classifier 13 may use, as an algorithm for clustering, Ward's method, k-means clustering, or the like.

In the embodiment, centroid calculator 14 calculates, for each of one or more clusters 5, centroid 42 using the strength of a reflected radio wave as a weighting coefficient, but centroid calculator 14 is not limited to the foregoing. For example, centroid calculator 14 may calculate centroid 42 for each of one or more clusters 5 by simply referencing only the positional information of scattered point 41.

In the embodiment, centroid calculator 14 also calculates, for each of one or more clusters 5, centroid 42 including centroid 42 calculated during the preceding period P1 as scattered point 41, but centroid calculator 14 is not limited to the foregoing. For example, centroid calculator 14 may calculate, for each of one or more clusters 5, centroid 42 without including centroid 42 that was calculated in the preceding period P1 as scattered point 41.

In the embodiment, centroid calculator 14 calculates, for each of one or more clusters 5, the plane coordinates (xy coordinates) of centroid 42, but centroid calculator 14 is not limited to the foregoing. For example, if scattered point 41 includes information on the height direction (z direction), centroid calculator 14 may calculate the three-dimensional coordinates (xyz coordinates) of centroid 42 for each of one or more clusters 5. In this case, "x" in the above-described equation (1) is to be replaced by "z" to calculate the z coordinate. Moreover, centroid calculator 14 may further calculate the mean value of the strength of reflected radio waves as information indicating centroid 42.

In the embodiment, detection system 10 is implemented by a single device, but detection system 10 may be implemented by a plurality of devices. If detection system 10 is implemented by a plurality of devices, the elements included in detection system 10 may be allocated to the plurality of devices in any manner. In addition, the elements included in detection system 10 according to the embodiment may be included in a server system provided in a facility or a location distant from the facility. In this case, detection system 10 is to wirelessly communicate with radio wave sensor 2 via a network such as the Internet to obtain reception signal Sig1 output from radio wave sensor 2, for example. In other words, the present invention may be implemented by cloud computing or edge computing.

For example, a communication method to be employed between devices in the above-described embodiments is not particularly limited. Moreover, a relay device that is not illustrated may be interposed between the devices for communication.

In addition, in the above-described embodiments, each of the elements may be implemented by executing a software program suitable for the element. Each element may be implemented by a program executor, such as a central processing unit (CPU) or a processor, loading and executing a software program stored in a recording medium such as a hard disk or a semiconductor memory.

Moreover, each element may be implemented by a hardware product. For example, each element may be a circuit (or an integrated circuit). These circuits may constitute a single circuit as a whole or may be individual circuits. In addition, these circuits may be general-purpose circuits or dedicated circuits.

These general and specific aspects of the present invention may be implemented using a system, a device, a method, an integrated circuit, a computer program, or a computer-readable recording medium such as a CD-ROM. The general or specific aspects of the present invention may also be implemented by an optional combination of a system, a device, a method, an integrated circuit, a computer program, and a recording medium.

For example, the present invention may be implemented as (i) a management method that a computer such as detection system 10 executes, (ii) a program for causing a computer to execute such a management method, or (iii) a non-transitory computer-readable recording medium on which such a program is recorded.

In the embodiment, detection system 10 may configure sensor system 100 together with radio wave sensor 2 as illustrated in FIG. 1. In other words, sensor system 100 includes detection system 10 and radio wave sensor 2 controlled by detection system 10.

Note that sensor system 100 may include detection system 10A according to the variation of the embodiment and radio wave sensor 2. In addition, detection system 10 and radio wave sensor 2 may be individual bodies in sensor system 100, or may be integrated. For example, sensor system 100 may be configured by including a signal processing circuit corresponding to detection system 10 inside the casing of radio wave sensor 2.

The present invention also encompasses: embodiments achieved by applying various modifications conceivable to those skilled in the art to each of the embodiments; and embodiments achieved by optionally combining the elements and functions of each of the embodiments without departing from the essence of the present invention.

CONCLUSION

As has been described above, detection system 10 includes obtainer 11, generator 12, classifier 13, centroid calculator 14, associator 15, and combiner 16. Obtainer 11 obtains reception signal Sig1 from radio wave sensor 2. Radio wave sensor 2 is a sensor that emits a radio wave from transmitting antenna 211 to target 3 and receives a reflected radio wave from target 3 via a plurality of receiving antennas 221. Generator 12 generates scattered point 41 including positional information of target 3, based on reception signal Sig1 obtained by obtainer 11. Classifier 13 classifies scattered point group 4 into one or more clusters 5. Scattered point group 4 is a set of scattered points 41 generated by generator 12 during predetermined length of time T1. Centroid calculator 14 calculates centroid 42 for each of the one or more clusters 5 classified by classifier 13. Associator 15 associates any of the one or more clusters 5 classified by classifier 13 with target 3. Combiner 16 combines, as scattered point 41, centroid 42 calculated by centroid calculator 14 during the preceding or an earlier period P1 with scattered point group 4.

According to the above-described detection system 10, a past cluster 5 is readily associated with the current cluster 5, and thus target 3 is readily captured. Consequently, detection system 10 has an advantage of readily improving the accuracy of detecting the position of target 3.

In addition, in detection system 10, scattered point 41 includes information about a strength of the reflected radio wave, and information about at least one of (i) a distance between target 3 and radio wave sensor 2 and (ii) a direction of target 3 relative to radio wave sensor 2, for example.

The above-described detection system 10 has an advantage of even more readily improving the accuracy of detecting the position of target 3.

Moreover, in detection system 10, associator 15 associates any of the one or more clusters 5 classified by classifier 13 with target 3, based on whether centroid 42 calculated during the preceding or an earlier period P1 is included in the one or more clusters 5, for example.

The above-described detection system 10 can even more readily associate a past cluster 5 with the current cluster 5. Consequently, detection system 10 has an advantage of even more readily capturing target 3.

In addition, in detection system 10, classifier 13 classifies scattered point group 4 into the one or more clusters 5 using an algorithm that eliminates an isolated point based on a density of the set of scattered points 41, for example.

In the above-described detection system 10, noise not related to target 3 is eliminated to readily classify a scattered point group into one or more clusters 5. Consequently, detection system 10 has an advantage of readily improving the accuracy of detecting target 3.

Moreover, in detection system 10, combiner 16 adjusts a combination amount or a delay amount of centroid 42 that was calculated during the preceding or earlier period P1 and is to be combined with scattered point group 4, for example.

The above-described detection system 10 has advantages of readily associating the current cluster 5 with a past cluster 5 and reducing the change in the position of cluster 5 with the passage of time.

In addition, in detection system 10, for each of the one or more clusters 5, combiner 16 increments a counter when cluster 5 does not include scattered point 41 other than centroid 42, resets the counter when cluster 5 includes scattered point 41 other than centroid 42, and discards centroid 42 when the counter reaches threshold (first threshold) Th1, for example.

The above-described detection system 10 can prevent cluster 5 that corresponds to target 3 from continuously remaining regardless of the absence of scattered point 41, or in other words, the absence of target 3. Consequently, the above-described detection system 10 has an advantage of readily improving the accuracy of detecting target 3.

Moreover, in detection system 10, for each of the one or more clusters 5, combiner 16 reduces the combination amount of centroid 42 when cluster 5 does not include scattered point 41 other than centroid 42, and restores the combination amount of centroid 42 when cluster 5 includes scattered point 41 other than centroid 42, for example.

The above-described detection system 10 can prevent cluster 5 that corresponds to target 3 from continuously remaining regardless of the absence of scattered point 41, or in other words, the absence of target 3. Consequently, the above-described detection system 10 has an advantage of readily improving the accuracy of detecting target 3.

In addition, in detection system 10, radio wave sensor 2 can switch an operation between a normal mode and a specific mode in which the radio wave is concentratedly emitted in a specific direction or is selectively received, for example. Combiner 16 increases the combination amount of centroid 42 when radio wave sensor 2 is operating in the specific mode, as compared to when radio wave sensor 2 is operating in the normal mode.

The above-described detection system 10 can readily and concentratedly emit or readily and selectively receive radio waves to or from target 3 using beamforming since the detection position of target 3 is unlikely to vary. Consequently, the above-described detection system 10 has an advantage of readily obtaining biological information of target 3.

Moreover, detection system 10A includes estimator 17 that estimates, for each of the one or more clusters 5 classified by classifier 13, centroid 42 to be calculated during the following or a later period P1, for example. Combiner 16 combines, as scattered point 41, centroid 42 that is to be calculated during the following or later period and is estimated by estimator 17 with scattered point group 4.

The above-described detection system 10A has an advantage of readily and accurately detecting the position of target 3 even if target 3 is moving.

In addition, sensor system 100 includes detection system 10, and radio wave sensor 2 controlled by detection system 10, for example.

According to the above-described sensor system 100, a past cluster 5 is readily associated with the current cluster 5, and thus target 3 is readily captured. Consequently, sensor system 100 has an advantage of readily improving the accuracy of detecting the position of target 3.

Moreover, a detection method includes obtainment step ST1, generation step ST2, classification step ST3, centroid calculation step ST4, association step ST5, and combination step ST6, for example. Obtainment step ST1 includes obtaining reception signal Sig1 from radio wave sensor 2. Radio wave sensor 2 is a sensor that emits a radio wave from transmitting antenna 211 to target 3 and receives a reflected radio wave from target 3 via a plurality of receiving antennas 221. Generation step ST2 includes generating scattered point 41 including positional information of target 3, based on reception signal Sig1 obtained in obtainment step ST1. Classification step ST3 includes classifying scattered point group 4 into one or more clusters 5. Scattered point group 4 is a set of scattered points 41 generated in generation step ST2 during predetermined length of time T1. Centroid calculation step ST4 includes calculating centroid 42 for each of the one or more clusters 5 classified in classification step ST3. Association step ST5 includes associating any of the one or more clusters 5 classified in classification step ST3 with target 3. Combination step ST6 includes combining, as scattered point 41, centroid 42 calculated in centroid calculation step ST4 during the preceding or an earlier period P1 with scattered point group 4.

According to the above-described detection method, a past cluster 5 is readily associated with the current cluster 5, and thus target 3 is readily captured. Consequently, the detection method has an advantage of readily improving the accuracy of detecting the position of target 3.

In addition, a recording medium is a non-transitory computer-readable recording medium having recorded thereon a program for causing one or more processors to execute the above-described detection method, for example.

According to the above-described recording medium, a past cluster 5 is readily associated with the current cluster 5, and thus target 3 is readily captured. Consequently, the recording medium has an advantage of readily improving the accuracy of detecting the position of target 3.

The invention claimed is:

1. A detection system comprising:
   a processor configured to perform operations comprising:
   obtaining a reception signal from a radio wave sensor, the radio wave sensor being a sensor that emits a radio wave from a transmitting antenna to a target and receives a reflected radio wave from the target via a plurality of receiving antennas;
   generating a scattered point including positional information of the target, defined in a coordinate system having the radio wave sensor as an origin point, based on the reception signal obtained in the obtaining;
   classifying a scattered point group into one or more clusters, the scattered point group being a set of scattered points each of which is the scattered point generated in the generating during a predetermined length of time;
   calculating a centroid for each of the one or more clusters classified in the classifying by calculating a weighted average of coordinates of the scattered points included in the cluster using, as weights, strengths of reflected radio waves of the scattered points by the classifier;
   associating any of the one or more clusters classified in the classifying with the target; and
   combining the centroid calculated in the calculating during a preceding or earlier period with the scattered point group, wherein
   the associating comprises associating any of the one or more clusters classified in the classifying with the target, based on whether the centroid calculated during the preceding or earlier period is included in the one or more clusters.

2. The detection system according to claim 1, wherein the scattered point includes information about a strength of the reflected radio wave, and information about at least one of a distance between the target and the radio wave sensor or a direction of the target relative to the radio wave sensor.

3. The detection system according to claim 1, wherein the associating comprises associating any of the one or more clusters classified in the classifying with the target, based on whether the centroid calculated during the preceding or earlier period is included in the one or more clusters.

4. The detection system according to claim 1, wherein the classifying comprises classifying classifies the scattered point group into the one or more clusters using an algorithm that eliminates an isolated point based on a density of the set of scattered points.

5. The detection system according to claim 1, wherein the combining comprises adjusting a combination amount or a delay amount of the centroid that was calculated during the preceding or earlier period and is to be combined with the scattered point group.

6. The detection system according to claim 5, wherein for each of the one or more clusters, the combining comprises incrementing a counter when the cluster does not include the scattered point other than the centroid, resetting the counter when the cluster includes the scattered point other than the centroid, and discarding the centroid when the counter reaches a threshold.

7. The detection system according to claim 5, wherein for each of the one or more clusters, the combining comprises reducing the combination amount of the centroid when the cluster does not include the scattered point other than the centroid, and restoring the combination amount of the centroid when the cluster includes the scattered point other than the centroid.

8. The detection system according to claim 5, wherein the radio wave sensor can switch an operation between a normal mode and a specific mode in which the radio wave is concentratedly emitted in a specific direction or is selectively received, and the combining comprises increasing the combination amount of the centroid when the radio wave sensor is operating in the specific mode, as compared to when the radio wave sensor is operating in the normal mode.

9. The detection system according to claim 1, the operations further comprising:

estimating, for each of the one or more clusters classified in the classifying, a centroid to be calculated during a following or later period, wherein the combining comprises combining, as the scattered point, the centroid that is to be calculated during the following or later period and is estimated by the estimating with the scattered point group.

10. A sensor system comprising:

the detection system according to claim 1; and the radio wave sensor controlled by the detection system.

11. A detection method comprising:

obtaining a reception signal from a radio wave sensor disposed at a fixed position within a detection space, the radio wave sensor being a sensor that emits a radio wave from a transmitting antenna to a target and receives a reflected radio wave from the target via a plurality of receiving antennas;

generating a scattered point including positional information of the target defined in a coordinate system having the radio wave sensor as an origin point, based on the reception signal obtained in the obtaining;

classifying a scattered point group into one or more clusters, the scattered point group being a set of scattered points each of which is the scattered point generated in the generating during a predetermined length of time;

calculating a centroid for each of the one or more clusters classified in the classifying by calculating a weighted average of coordinates of the scattered points included in the cluster using, as weights, strengths of reflected radio waves of the scattered points;

associating any of the one or more clusters classified in the classifying with the target; and combining the centroid calculated in the calculating during a preceding or earlier period with the scattered point group, wherein the associating comprises associating any of the one or more clusters classified in the classifying with the target, based on whether the centroid calculated during the preceding or earlier period is included in the one or more clusters.

12. A non-transitory computer-readable recording medium having recorded thereon a program for causing one or more processors to execute the detection method according to claim 11.

13. The detection system according to claim 1, wherein in response to detecting that the centroid calculated during the preceding or earlier period is included in one cluster among the one or more clusters, the associating comprises associating the one cluster with the target.

* * * * *